(12) United States Patent
Choi et al.

(10) Patent No.: US 9,647,590 B2
(45) Date of Patent: May 9, 2017

(54) APPARATUS FOR COMPENSATING PHASE ERROR IN INVERTER OUTPUT VOLTAGE

(71) Applicant: LSIS CO., LTD., Anyang-si, Gyeonggi-do (KR)

(72) Inventors: Seungcheol Choi, Anyang-si (KR); Anno Yoo, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 4 days.

(21) Appl. No.: 14/518,742

(22) Filed: Oct. 20, 2014

(65) Prior Publication Data

US 2015/0115858 A1    Apr. 30, 2015

(30) Foreign Application Priority Data

Oct. 29, 2013    (KR) .................. 10-2013-0128909

(51) Int. Cl.
| | | |
|---|---|---|
| *H02P 21/00* | (2016.01) | |
| *H02M 7/5387* | (2007.01) | |
| *H02M 1/00* | (2006.01) | |

(52) U.S. Cl.
CPC .... *H02P 21/0003* (2013.01); *H02M 7/53873* (2013.01); *H02M 2001/0012* (2013.01)

(58) Field of Classification Search
CPC .................................................. H02J 7/0016
USPC ........................................................ 318/504
See application file for complete search history.

(56) References Cited

U.S. PATENT DOCUMENTS

| | | | | |
|---|---|---|---|---|
| 5,920,161 | A * | 7/1999 | Obara | B60L 3/0023 180/65.225 |
| 8,750,009 | B2 * | 6/2014 | Furutani | H02M 7/53875 363/132 |
| 2009/0058331 | A1 * | 3/2009 | Aoyagi | H02M 7/53873 318/255 |
| 2010/0148707 | A1 * | 6/2010 | Tobari | H02P 6/085 318/400.02 |
| 2010/0194319 | A1 * | 8/2010 | Ito | H02P 21/14 318/400.13 |
| 2010/0271853 | A1 * | 10/2010 | Furutani | H02M 7/53875 363/132 |

FOREIGN PATENT DOCUMENTS

| | | |
|---|---|---|
| CN | 1249077 | 3/2000 |
| CN | 102170260 | 8/2011 |
| CN | 102237816 | 11/2011 |
| CN | 102868339 | 1/2013 |
| EP | 2487780 | 8/2012 |
| JP | 64-60264 | 3/1989 |

(Continued)

OTHER PUBLICATIONS

The State Intellectual Property Office of the People's Republic of China Application Serial No. 201410594498.9, Office Action dated Sep. 2, 2015, 7 pages.

(Continued)

*Primary Examiner* — Bentsu Ro
*Assistant Examiner* — Devon Joseph
(74) *Attorney, Agent, or Firm* — Lee, Hong, Degerman, Kang & Waimey

(57) ABSTRACT

A phase compensation apparatus in an inverter output voltage in a system is provided, whereby performance of an inverter can be enhanced by compensating a time delay of measured voltage of inverter output voltage detection unit.

6 Claims, 3 Drawing Sheets

(56) References Cited

FOREIGN PATENT DOCUMENTS

| JP | 08-205598 | 8/1996 |
|---|---|---|
| JP | 2010-246260 | 10/2010 |
| WO | 90/15472 | 12/1990 |

OTHER PUBLICATIONS

European Patent Office Application Serial No. 14189372.7, Search Report dated Mar. 31, 2015, 7 pages.
Japan Patent Office Application Serial No. 2014-220166, Office Action dated Dec. 1, 2015, 2 pages.

\* cited by examiner

APPARATUS FOR COMPENSATING PHASE ERROR IN INVERTER OUTPUT VOLTAGE

CROSS-REFERENCE TO RELATED APPLICATIONS

Pursuant to 35 U.S.C. §119(a), this application claims the benefit of earlier filing date and right of priority to Korean Patent Application No. 10-2013-0128909, filed on Oct. 29, 2013, the contents of which are all hereby incorporated by reference herein in its entirety.

BACKGROUND OF THE DISCLOSURE

Field

The teachings in accordance with the exemplary embodiments of this present disclosure generally relate to a phase compensation device, and more particularly to an apparatus for compensating a phase in an inverter output voltage.

Background

About 30% of all the global energy is an electric energy. In other words, about 30% of all the global energy is used to generate electricity. In general, electricity is generated in an AC (Alternating Current) voltage of 50 Hz or 60 Hz frequency from a power plant, and current, size of voltage, frequency and phase are converted to use the electric energy. The converted electric energy is finally used from a load to a signal having light, heat, power or information. A device having a function to control and convert the power is called a power converter.

Although a control system in an initial inverter circuit is formed with an analogue circuit using basic electronic circuit elements such as transistors and diodes, the control system is currently formed by one or a plurality of DSPs (Digital Signal Processors). The digital system is operated in discrete time and therefore, a time delay with more than one sampling is inevitable. A time delay element is generated such as an ADC (Analog-to-digital converter), a sampling and a read/write when a measurement device such as an inverter output voltage detection circuit is used, which becomes a factor that impedes the performance during detection of inverter output voltage. Meantime, when the voltage measurement device is formed with an analogue system, the system is delayed by a time constant of a filter used for voltage detection.

SUMMARY OF THE DISCLOSURE

The technical subject to be solved by the present disclosure is to provide an apparatus for compensating a phase (hereinafter referred to as "phase compensation apparatus, or simply "apparatus") in an inverter output voltage configured to reduce an error generated by a time delay of voltage measured by an inverter output voltage measurement device using a phase of inverter command voltage.

In one general aspect of the present disclosure, there is provided a phase compensation apparatus in an inverter output voltage in a system including an inverter configured to supply a voltage to a motor, a controller configured to supply a command voltage to the inverter and a voltage detection unit configured to detect an inverter output voltage, the apparatus comprising:

a first determination unit configured to determine a size of the command voltage;

a second determination unit configured to determine a size of the inverter output voltage;

a first normalization unit configured to calculate a phase of the command voltage in a trigonometric function format by normalizing the command voltage using the size of the command voltage, which is an output of the first determination unit;

a first conversion unit configured to convert the inverter output voltage to a rotary coordinate system using the phase of the command voltage of trigonometric function format;

a second normalization unit configured to calculate a phase error between the inverter output voltage and the command voltage by normalizing the inverter output voltage converted to the rotary coordinate system to a size of the inverter output voltage which is an output of the second determination unit; and a second conversion unit configured to output a compensation voltage by converting the inverter output voltage to a rotary coordinate system using the phase error of trigonometric function format.

Preferably, but not necessarily, the apparatus may further comprise a third conversion unit configured to convert a line-to-line voltage of the motor inputted from the voltage detection unit to a stationary coordinate system.

Preferably, but not necessarily, the first determination unit may include first and second calculation units each configured to square the command voltages which are inputted two variables of the stationary coordinate system, a first addition unit configured to add outputs of the first and second calculation units, and a third calculation unit configured to calculate a square root of an output of the first addition unit.

Preferably, but not necessarily, the second determination unit may include fourth and fifth calculation units each configured to square the inverter output voltages which are inputted two variables of the stationary coordinate system, a second addition unit configured to add outputs of the fourth and fifth calculation units, and a third calculation unit configured to calculate a square root of an output of the second addition unit.

Preferably, but not necessarily, an output of the first conversion unit may be a vector in which the inverter output voltages are projected on synchronous coordinate systems of each reference coordinate system of the command voltage.

Preferably, but not necessarily, an output of the second conversion unit may be a phase-compensated voltage, a size of the phase-compensated voltage may be same as a size of the output voltage of the inverter, and phase of compensated voltage may be same as phase of the command voltage.

Preferably, but not necessarily, a size of the compensation voltage which is an output of the second conversion unit may be same as that of the inverter output voltage, and a phase of the compensation voltage may be same as that of the command voltage.

Advantageous Effects of the Disclosure

The present disclosure has an advantageous effect in that performance of an inverter can be enhanced by compensating a time delay of a measurement voltage by an inverter voltage detection unit.

DETAILED DESCRIPTION OF THE DISCLOSURE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Hereinafter, exemplary embodiments of the present disclosure will be described in detail with reference to the accompanying drawings.

Figure 1:
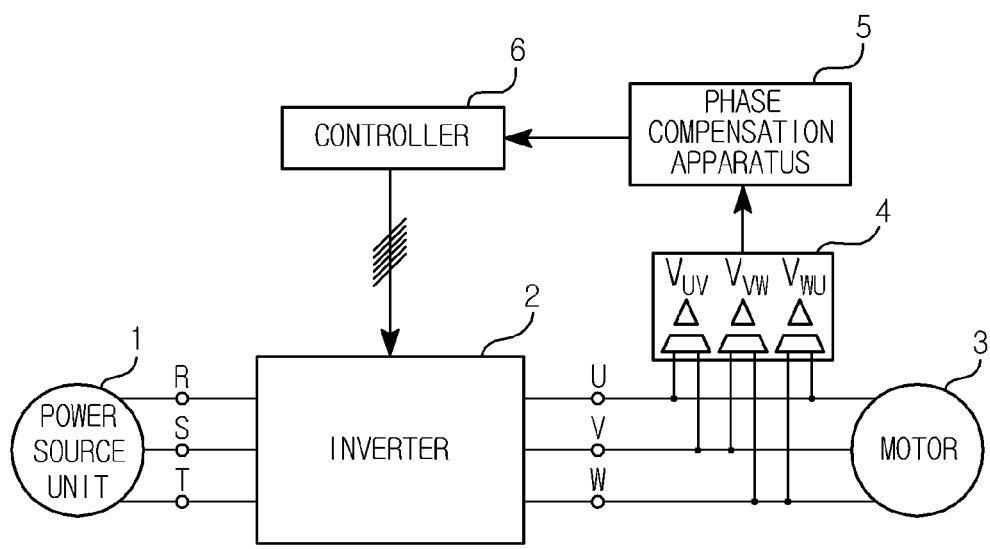
FIG. 1 is a block diagram illustrating a power conversion system according to prior art.

FIG. 1 is a block diagram illustrating a power conversion system according to prior art.

Referring to FIG. 1, an inverter system according to the present disclosure may include a power unit (1), an inverter (2), a motor (3), a voltage detection unit (4), a phase compensation apparatus (5) of the present disclosure and a controller (6).

First, explanation will be given for an operation of an inverter system where no phase compensation apparatus (5) of the present disclosure is provided.

When a 3-phase AC power source is applied from the power unit (1) in the inverter system of FIG. 1, the inverter (2) supplies an AC voltage to the motor (3) by converting size and frequency of the AC voltage through switching of inner power semiconductors.

In general, the inverter (2) serves to vary the size and frequency of an output voltage in response to control of the controller (6), where the output voltage is distorted by an influence of non-linear factor such as dead time to generate an error to output voltage information used by the controller (6).

The voltage detection unit (4) reduces an error of output voltage information by measuring a line-to-line voltage applied to the motor (3) and transmitting to the controller (6) output voltage information including non-linear factor generating an error.

Figure 2:
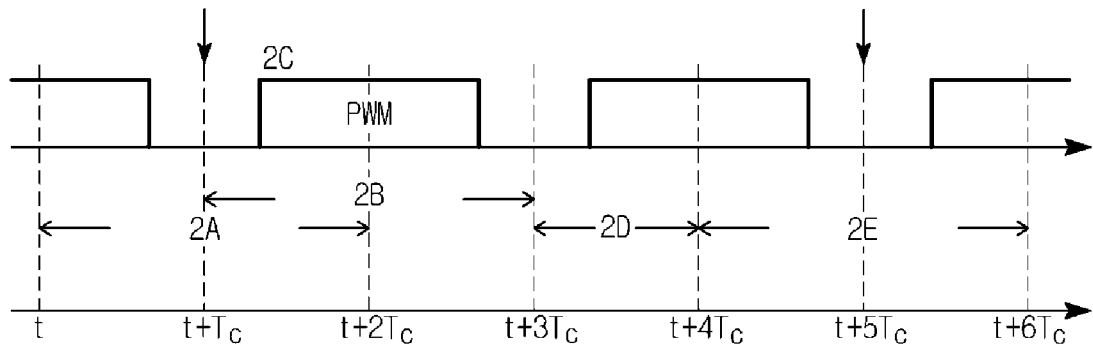
FIG. 2 is a timing diagram illustrating an operation of a voltage detection unit of FIG. 1.

FIG. 2 is a timing diagram illustrating an operation of a voltage detection unit of FIG. 1, where the voltage detection unit (4) includes an integrator.

Reference numeral 2A in FIG. 2 defines a voltage command generation section of the inverter. 2C defines a PWM (Pulse Width Modulation) output voltage of the inverter (2), which is an output relative to a voltage command generated from 2A. 2D is a an A/D conversion and read/write section, and 2E is a section where voltage information is used that is measured for driving the motor (3) by reading an output voltage information signal.

An output voltage of 2C is integrated by the 2B section to allow the 2D section to read and use the voltage information measured by the 2E section through A/D conversion and read/write operations. Thus, the voltage detection unit (4) has a time delay factor generated in the course of sampling time, read/write operations. The measured voltage is used by 2E section over the voltage command generated by the 2A section, and therefore delayed by as much as 4Tc.

Meantime, when the voltage detection unit (4) is formed with an analogue circuit, the voltage detection unit is delayed by a time constant of a filter used in the course of voltage detection.

Figure 3:
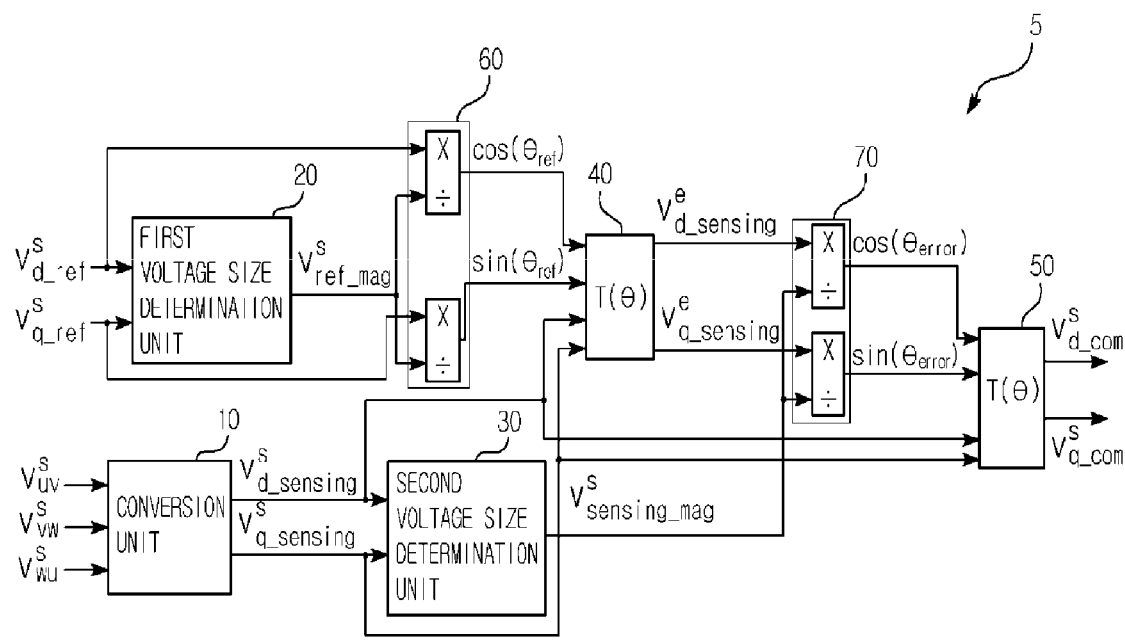
FIG. 3 is a block diagram illustrating an output voltage phase compensation apparatus according to an exemplary embodiment of the present disclosure.

FIG. 3 is a block diagram illustrating an output voltage phase compensation apparatus according to an exemplary embodiment of the present disclosure, which is provided to the inverter system as in FIG. 1.

Referring to FIG. 3, the phase compensation apparatus (5) according to the present disclosure may include a conversion unit (10), a first voltage size determination unit (20), a second voltage size determination unit (30), a first coordinate conversion unit (40), a second coordinate conversion unit (50) and first and second normalization units (60, 70).

The output voltage phase compensation apparatus according to the present disclosure phase-shifts a measured voltage through a coordinate conversion using command voltages ($v^s_{d\_ref}$, $v^s_{q\_ref}$) of the inverter (2) and voltages ($v^s_{d\_sensing}$, $v^s_{q\_sensing}$) measured by the voltage measurement unit (4), and in turn provides the phase-shifted measurement voltage to the controller (6).

The conversion unit (10) functions to convert 3-phase voltage information ($v^s_{uv}$, $v^s_{vw}$, $v^s_{wu}$) measured by the voltage detection unit (4) to d axis and q axis voltages of stationary coordinate system. Although the inputted voltage information has exemplified a line-to-line voltage, the inputted voltage may be terminal voltage.

The first voltage size determination unit (20) may determine a voltage size of inverter command voltage which is a stationary coordinate system, and the second voltage size determination unit (30) may determine a voltage size of a voltage {i.e., output of the conversion unit (4)} measured by the voltage detection unit (4).

The first and second coordinate conversion units (40, 50) respectively convert inputted variables of stationary coordinate system to a rotary coordinate system. Hereinafter, an operation of phase compensation apparatus of FIG. 3 will be explained. The d axis and q axis command voltages ($v^s_{d\_ref}$, $v^s_{q\_ref}$) of stationary coordinate system and the measured voltages ($v^s_{d\_sensing}$, $v^s_{q\_sensing}$) are used, and size of the compensated voltages ($v^s_{d\_com}$, $v^s_{q\_com}$) are determined as measured voltages, and phase has a phase of the command voltage.

At this time, the command voltage is inputted from the controller (6) of FIG. 1, and the measured voltage is measured by the voltage detection unit (4) and determined as d, q axis voltages by coordinate conversion of the conversion unit (10) of FIG. 3.

When the measured voltage is an output line-to-line voltage, operation of the conversion unit (10) may be performed by the following Equations.

$$v_u^s = (2v_{uv}^s + v_{vw}^s)/3 \qquad [\text{Equation 1}]$$

$$v_v^s = (2v_{vw}^s + v_{wu}^s)/3 \qquad [\text{Equation 2}]$$

$$v_w^s = (2v_{wu}^s + v_{uv}^s)/3 \qquad [\text{Equation 3}]$$

$$v^s_{d\_sensing} = (2v_u^s - v_v^s - v_w^s)/3 \qquad [\text{Equation 4}]$$

$$v^s_{q\_sensing} = (v_v^s - v_w^s)/\sqrt{3} \qquad [\text{Equation 5}]$$

Figure 4:
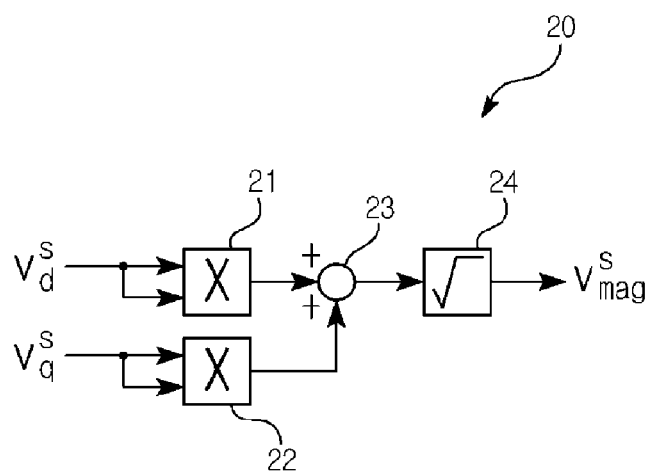
FIG. 4 is a detailed block diagram illustrating first and second voltage size determination units of FIG. 3.

FIG. 4 is a detailed block diagram illustrating first and second voltage size determination units of FIG. 3, where although description has been made on the first voltage size determination unit (20), the second voltage size determination unit (30) also has the same configuration as the first voltage size determination unit (20). Furthermore, although subscripts 'ref' and 'sensing' are omitted from the inputted signal in FIG. 2, it should be apparent that relevant subscripts are added when applied to FIG. 3.

Referring to FIG. 4, the first voltage size determination unit (20) may includes square calculation units (21, 22), an addition unit (23) and a square root calculation unit (24), where d axis and q axis variables of the stationary coordinate system having an inputted 90 degree phase difference are respectively multiplied by the square calculation units, which are added by the addition unit (23), and the square root calculation unit (24) obtains a square root of an output of the addition unit (23) to calculate the size of the input voltage. The calculated voltage size is used to normalize the size of trigonometric function as "1" used by the first normalization unit (60) at the first and second coordinate conversion units.

The input voltages ($v_d^s$, $v_q^s$) in FIG. 4 are AC variables having a 90 degree phase difference, and the size ($v_{mag}^s$) of the input voltage which is an output has a positive (+) value.

At this time, d axis command voltage ($v_{d\_ref}^s$) is considered as a sinusoidal signal as a cosine signal, and q axis command voltage ($v_{q\_ref}^s$) is considered as a sine signal. Furthermore, the first normalization unit (60) normalizes the command voltage to a size of command voltage which is an output of the first voltage size determination unit (20), using the size of voltage calculated by the first and second voltage size determination units (20, 30), and calculates the phase of command voltage using the trigonometric functions (sin ($\theta_{ref}$), cos ($\theta_{ref}$)), the calculation of which may be defined as under:

$$\sin(\theta_{ref}) = v_{q\_ref}^s / v_{ref\_mag}^s \qquad \text{[Equation 6]}$$

$$\cos(\theta_{ref}) = v_{d\_ref}^s / v_{ref\_mag}^s \qquad \text{[Equation 7]}$$

The trigonometric functions calculated by the above Equations 6 and 7 are used for coordination conversion of the first coordinate conversion unit (40) of FIG. 3. That is, the first coordinate conversion unit (40) receives an output of the first normalization unit (60) and an output of the conversion unit (10) to convert the output of the conversion unit (10) from the stationary coordinate system to a rotary coordinate system.

$$v_{d\_sensing}^e = v_{d\_sensing}^s \times \cos(\theta_{ref}) + v_{q\_sensing}^s \times \sin(\theta_{ref}) \qquad \text{[Equation 8]}$$

$$v_{q\_sensing}^e = -v_{d\_sensing}^s \times \sin(\theta_{ref}) + v_{q\_sensing}^s \times \cos(\theta_{ref}) \qquad \text{[Equation 9]}$$

Figure 5:
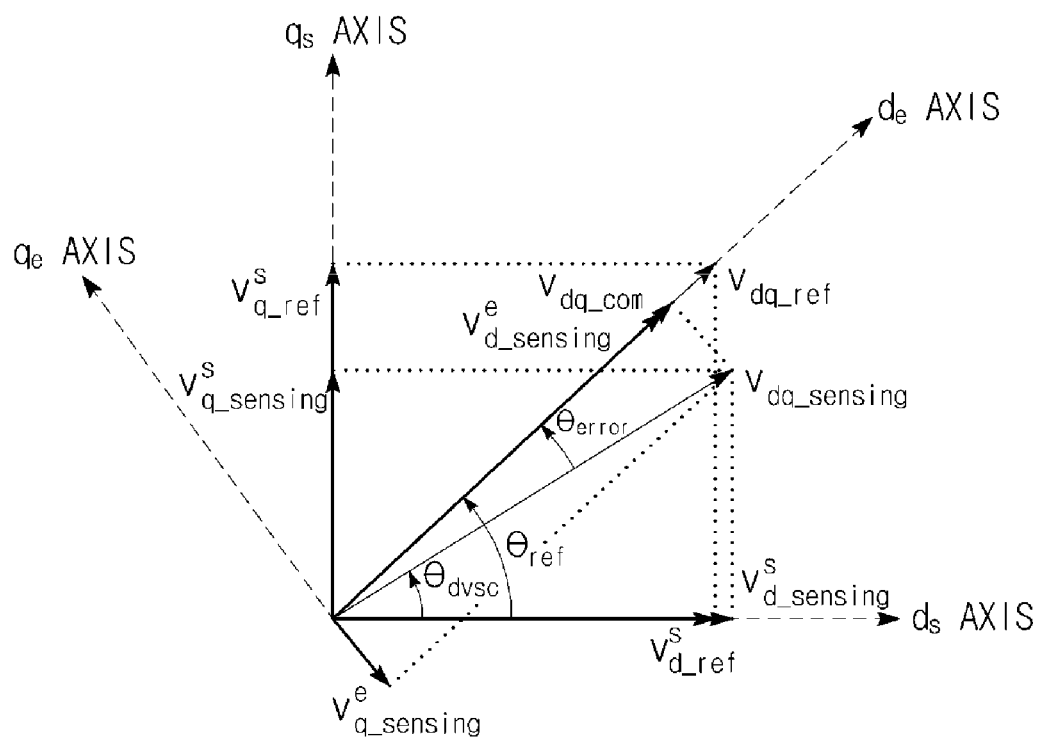
FIG. 5 is a schematic view illustrating a coordinate conversion between input and output of FIG. 3.

FIG. 5 is a schematic view illustrating a coordinate conversion between input and output of FIG. 3.

The $v_{d\_sensing}^e$ and $v_{q\_sensing}^e$ which are rotary coordinate systems calculated by the Equations 8 and 9 are vectors where $v_{dq\_sensing}$ which is a voltage measured by the voltage detection unit (4) is projected on $d_e$ axis and $q_e$ axis of synchronous coordinate system of each reference coordinate system of command voltage. These voltages are constant because the rotary angular velocity is same as angular velocity of synchronous coordinate system of each reference coordinate system of command voltage.

The second voltage size determination unit (30) outputs a size ($v_{sensing\_mag}^s$) of measured voltage, and the second normalization unit (70) normalizes $v_{d\_sensing}^e$ and $v_{q\_sensing}^e$ which are rotary coordinate system received from the first coordinate conversion unit (40) to sizes of measured voltages. The normalized trigonometric function defines the measured voltage and phase error ($\theta_{error}$) of command voltage, which may be expressed by the following Equations.

$$\sin(\theta_{error}) = v_{q\_sensing}^e / v_{sensing\_mag}^s \qquad \text{[Equation 10]}$$

$$\cos(\theta_{error}) = v_{d\_sensing}^e / v_{sensing\_mag}^s \qquad \text{[Equation 11]}$$

The output of the second normalization unit (70) is used for coordinate conversion of the second coordinate conversion unit (50). The second coordinate conversion unit (50) receives an output of the second normalization unit (70) and an output of the conversion unit (10) and converts the output of the conversion unit (10) from the stationary coordinate system to a rotary coordinate system as per the following Equations.

$$v_{d\_com}^s = v_{d\_sensing}^s \times \cos(\theta_{error}) + v_{q\_sensing}^s \times \sin(\theta_{error}) \qquad \text{[Equation 12]}$$

$$v_{q\_com}^s = -v_{d\_sensing}^s \times \sin(\theta_{error}) + v_{q\_sensing}^s \times \cos(\theta_{error}) \qquad \text{[Equation 13]}$$

The voltages calculated by the above Equations 12 and 13 are voltages compensated in phase by the present disclosure, and correspond to $v_{dq\_com}$ of FIG. 5. the size of compensated voltage is same as the size of voltage measured by the voltage detection unit (4), and phase is same as the phase of the command voltage (in-phase). The compensated measured voltage has no phase error generated by time delay factor, and the controller (6) may provide the command voltage to the inverter (2) by replacing the command voltage with a compensation voltage.

As apparent from the foregoing, the present disclosure compensates the time delay relative to an output voltage of the inverter (2) detected by the voltage detection unit (4). The phase compensation by the present disclosure requires no separate trigonometric function, and can realize sizes of command voltage and measured voltage through coordinate conversion. The compensated voltage phase is determined by the command voltage, and the size of voltage is determined by the measured voltage of the voltage detection unit (4). The compensated voltage information is accurate output voltage information of the inverter (20) including non-linear factor such as dead time, whereby performance of inverter can be enhanced.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

What is claimed is:

1. A phase compensation apparatus in an inverter output voltage in a system, the system comprising:
   an inverter configured to output a supply voltage to a motor;
   a controller configured to supply a command voltage to the inverter;
   a voltage detection unit configured to detect the supply voltage;
   a first determination unit configured to determine the command voltage;
   a second determination unit configured to determine the supply voltage;
   a first normalization unit configured to calculate a phase of the command voltage in a trigonometric function format by normalizing the command voltage using the determined magnitude of the command voltage;

a first conversion unit configured to convert the supply voltage to a rotary coordinate system using the phase of the command voltage;

a second normalization unit configured to calculate a phase error between the supply voltage and the command voltage by normalizing the converted supply voltage according to the supply voltage; and a second conversion unit configured to output a compensation voltage by converting the supply voltage to the rotary coordinate system using the calculated phase error, wherein the compensation voltage is identical to the supply voltage, and wherein a phase of the compensation voltage is identical to the calculated phase of the command voltage.

2. The apparatus of claim 1, further comprising a third conversion unit configured to convert a line-to-line motor voltage output from the voltage detection unit to a stationary coordinate system.

3. The apparatus of claim 1, wherein the first determination unit comprises:

first and second calculation units each configured to calculate a square of the command voltage that is received as two variables of a stationary coordinate system;

an addition unit configured to sum outputs of the first and second calculation units; and a third calculation unit configured to calculate a square root of an output of the addition unit.

4. The apparatus of claim 1, wherein the second determination unit comprises:

first and second calculation units each configured to calculate a square of the supply voltage that is received as two variables of a stationary coordinate system;

an addition unit configured to sum outputs of the first and second calculation unit; and a third calculation unit configured to calculate a square root of an output of the addition unit.

5. The apparatus of claim 1, wherein an output of the first conversion unit is a vector in which the output voltage is projected on synchronous coordinate systems of each reference coordinate system of the command voltage.

6. The apparatus of claim 1, wherein the compensation voltage is provided to the controller as the command voltage.

* * * * *